US007323994B2

(12) United States Patent
Yamagajo et al.

(10) Patent No.: US 7,323,994 B2
(45) Date of Patent: Jan. 29, 2008

(54) RFID TAG

(75) Inventors: Takashi Yamagajo, Yokosuka (JP); Toru Maniwa, Setagaya (JP); Manabu Kai, Yokosuka (JP); Hiroyuki Hayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 11/035,734

(22) Filed: Jan. 18, 2005

(65) Prior Publication Data

US 2006/0097058 A1 May 11, 2006

(30) Foreign Application Priority Data

Oct. 27, 2004 (JP) ............................ 2004-313061

(51) Int. Cl.
*G08B 13/14* (2006.01)

(52) U.S. Cl. .................. 340/572.7; 343/741; 343/866; 343/878

(58) Field of Classification Search ............ 340/572.7, 340/572.1; 343/741, 742, 866, 871, 878, 343/880, 881
See application file for complete search history.

(56) References Cited

U.S. PATENT DOCUMENTS 5,392,028 A * 2/1995 Pichl ...................... 340/572.5
5,751,256 A * 5/1998 McDonough et al. ....... 343/873
5,972,156 A * 10/1999 Brady et al. ............ 340/572.1
6,840,440 B2 * 1/2005 Uozumi et al. ............ 235/375
6,999,028 B2 * 2/2006 Egbert ................ 343/700 MS

OTHER PUBLICATIONS

Mitsuru Muramato, Nozomu Ishii and Kiyohiko Itoh, *Characteristics of a Small Planar Loop Antenna*, Dec. 1997, pp. 1818-1822, IEEE Transactions On Antennas and Propagation, vol. 45, No. 12.

* cited by examiner

*Primary Examiner*—Thomas Mullen
(74) *Attorney, Agent, or Firm*—Bingham McCutchen LLP

(57) ABSTRACT

An RFID tag which has improved radiation/reception characteristics when used in proximity to the human body, and has an antenna which, when stacked with a 13 MHz band RFID tag, does not have an effect on the loop antenna of that tag. An RFID tag assembly comprises a first RFID tag having a coiled loop antenna and a second RFID tag superposed on the first RFID tag, the second RFID tag comprising an antenna formed by a metal member which covers at least a portion of a surface of a dielectric substrate, an electronic part mounted on the metal member, and a member which is provided with the overlapped coiled loop antenna of the first RFID tag housed in the end thereof so as to cover a portion of the antenna formed by the metal member.

33 Claims, 12 Drawing Sheets

RFID TAG

CROSS REFERENCE TO RELATED APPLICATION

This application is related to and claims priority to Japanese Application No. 2004-313061 filed Oct. 27, 2004 in the Japanese Patent Office, the contents of which are incorporated by reference herein.

BACKGROUND OF THE INVENTION

1. Field of the Invention

The present invention relates to UHF-band RFID tags, and concerns an RFID tag in which, even when a card-type 13 MHz band RFID tag is included with it, the effects on the loop antenna of the 13 MHz band RFID card are reduced, and good radiation and receiving characteristics can be obtained even when used in proximity to the human body.

2. Description of the Related Art

The RFID tag is explained using a conventional folded dipole antenna.

FIG. 1 shows the upper face of a thin RFID tag 500. A chip 510 placed on an aperture 550 is connected to contacts 525 on a flexible substrate 520, and the substrate 520 is has at least two folded dipole antennas 530 and 531 contained therein.

A wireless tag having a conventional ground plane is next explained.

FIG. 2 shows the configuration of a wireless tag 1. FIG. 2(*a*) is a plan view of the wireless tag 1 and (*b*) is a sectional view thereof.

The wireless tag 1 has a circular polarized wave matching form and is composed of an emitting-side conductive sheet 2 having a radio wave emitting face 2*a*, an earth-side conductive sheet 3, which has an earth face 3*a*, a semiconductor module 4 and a dielectric part 5. Here, an antenna element 6 is constituted by interposing the dielectric part 5 between the emitting-side conductive sheet 2 and earth-side conductive sheet 3, and the emitting-side conductive sheet 2 is one having a circular form with a rectangular cut-out area 7 (aperture) in its center. One terminal 4*a* of the semiconductor module 4 is connected to the emitting-side conductive sheet 2 and the other terminal 4*b* to the earth-side conductive sheet 3. The impedance observed between one point of the radio wave emitting face 2*a* from the dielectric part 5 in the earth face 3*a*, as is well-known, approaches 0 approaching the center of the radio wave emitting face 2*a*, and increases approaching the edge of the radio wave emitting face 2*a*.

At the edge of the radio wave emitting face 2*a*, the impedance reaches a high level of several hundred ohms.

With respect to the position of the semiconductor module 4, the module is connected in a vicinity where the impedance observed from both terminals 4*a* and 4*b* of the semiconductor module 4 can be better adjusted to the impedance between the radio wave emitting face 2*a* and the earth face 3*a*. Adjustment is performed so as to include impedance characteristics dependent upon the length and width of the terminals 4*a* and 4*b*. The circularly-polarized signal emitted from the interrogator is captured by the radio wave emitting face 2*a* and input to the semiconductor module 4. When tag information is read, the signal wave that has been input to the wireless tag 1 is modulated according to the information in the wireless tag 1 and, by changing the tag impedance, the input wave is reflected and returned from the radio wave emitting face 2*a* to the interrogator.

Devices such as these are shown, for example, in Japanese Unexamined Patent Application Publication H8-88586 and Japanese Unexamined Patent Application Publication 2002-353735.

A card-type 13 MHz band RFID tag uses a coiled loop antenna and, when a separate UHF band or 2.45 GHz band RFID tag is superposed so as to cover the front or back face of this coiled loop antenna, the magnetic flux passing through the interior of the coiled loop antenna is blocked by the metal of the superposed UHF band or 2.45 GHz band RFID tag, and hardly any current is produced on the loop antenna. As a result, current is not supplied to the chip on the card-type 13 MHz band RFID tag, which fails to operate, and communication cannot be achieved.

As a separate problem from that described above, when a conventional UHF band RFID tag (e.g., a tag having a folded dipole antenna) is used in proximity to the human body, there has been the problem that the characteristics have deteriorated.

Moreover, while conventional tags having a ground plane may not suffer deterioration of characteristics in proximity to the human body, since the antenna has both a front and back side, characteristics have been known to deteriorate when the antenna element is turned toward the human body.

SUMMARY OF THE INVENTION

The present invention was produced in light of the aforementioned problems and has the objective of offering an RFID tag in which, even when overlapped with a card-type 13 MHz band RFID tag, the effects of the 13 MHz band RFID card on the loop antenna are reduced, and good radiation and receiving characteristics can be obtained even when used in proximity with the human body.

An embodiment of the present invention uses a single RFID tag which is superposed on another RFID tag having a coiled loop antenna, said RFID tag comprising an antenna formed by a planar metal which covers the surface of a dielectric substrate, an electronic part mounted on said plate-form metal, and a member which is provided with an overlapped coiled loop antenna of said single RFID tag housed in the end thereof so as to cover a portion of said antenna.

An embodiment of the present invention uses a single RFID tag which is superposed on another RFID tag having a coiled loop antenna, said RFID tag comprising an antenna formed by a partially cut-out plate-form metal member which covers the surface of a dielectric substrate, an electronic part mounted on said plate-form metal member, and a member which is provided with an overlapped coiled loop antenna of said single RFID tag housed in the end thereof so as to cover a portion of said antenna.

An embodiment of the present invention uses an RFID tag formed of an antenna and an electronic part, and comprising an antenna formed by a metal member forming a folded loop which covers the surface of a dielectric substrate, an electronic part mounted on said metal member, and a member which houses said antenna in its end.

An embodiment of the present invention uses an RFID tag formed of an antenna and an electronic part, and comprising an antenna formed by a metal member which covers the surface of a dielectric substrate, and which forms a loop near the center portion of which both ends of the loop are folded, an electronic part mounted on said metal member, and a member which houses said antenna in its end.

In the present invention, due to the use of embodiments described above, even when a 13 MHz band RFID tag is superposed, sufficient current is generated on the coiled loop antenna to allow communication to be performed satisfactorily by the 13 MHz band RFID tag. This is done by preventing interference with the magnetic flux passing through the interior of the coiled loop antenna of the 13 MHz band RFID tag. Moreover, deterioration of emission and receiving characteristics due to the effects of the human body can be avoided, and gain can be increased at the same time as bandwidth is broadened.

DETAILED DESCRIPTION OF THE PREFERRED EMBODIMENTS

An embodiment of the present invention is next explained, with reference to the drawings.

Figure 1:
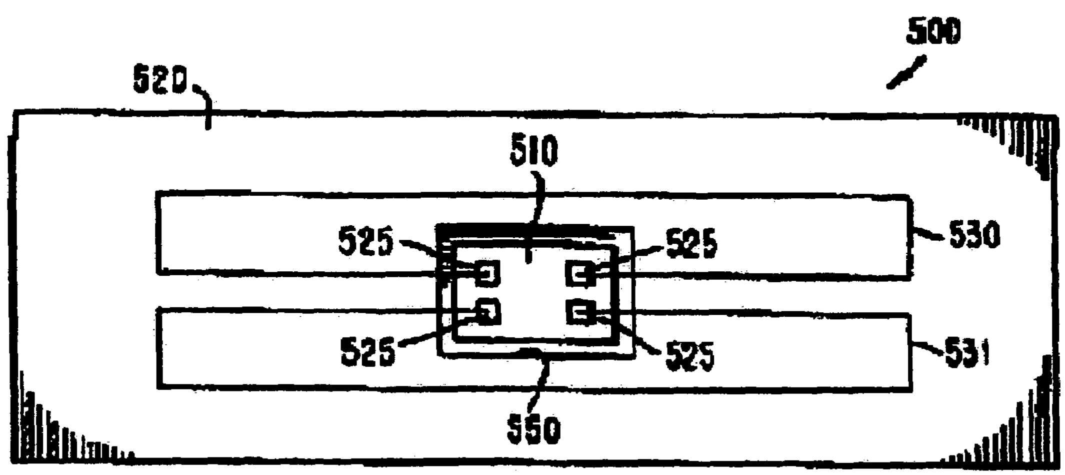
FIG. 1 is an upper plan view of a conventional thin-form tag having at least two folded dipole antennas.
Figure 2:
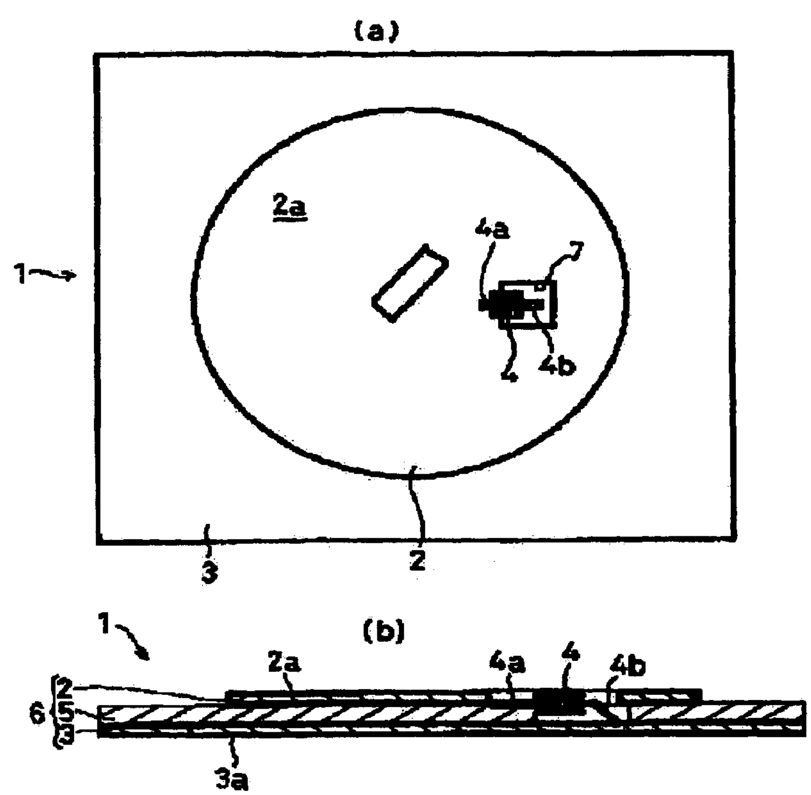
FIG. 2 is a block diagram of a conventional wireless tag 1, (*a*) is a plan view and (*b*) is a cross-section.
Figure 3:
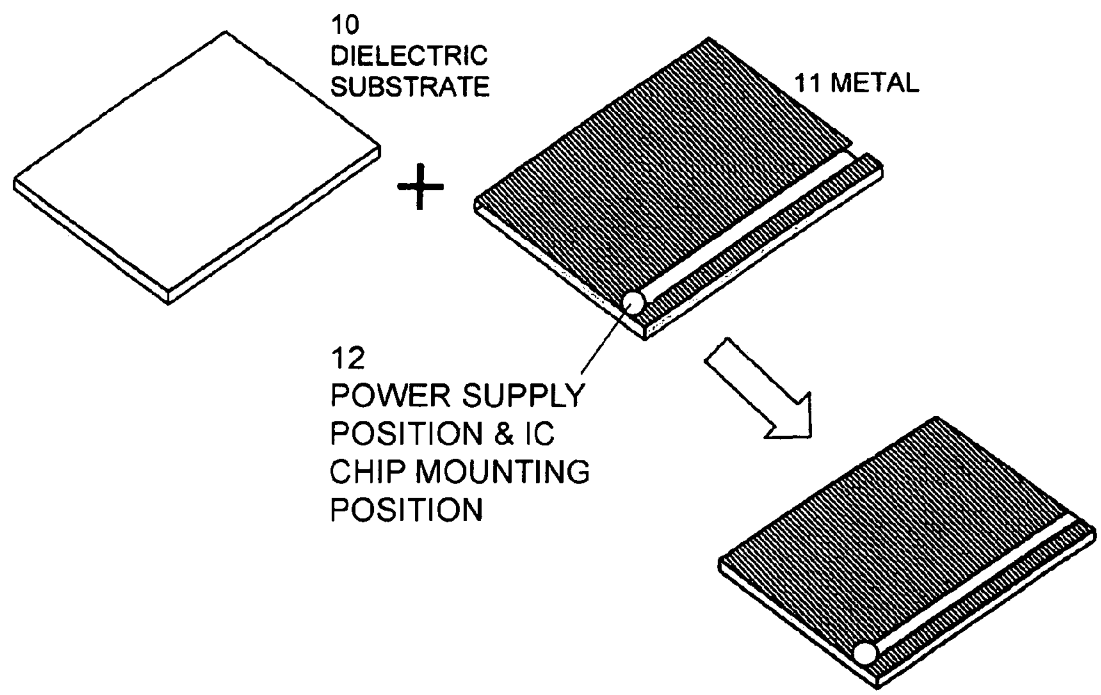
FIG. 3 is a diagram showing the configuration of an exemplary embodiment of a plate-form loop antenna of the present invention.

FIG. 3 shows the configurations of a planar loop antenna according to the present invention. In FIG. 3, a metal part 11 the surface of which is partially cut-out is wrapped on a dielectric substrate 10, and the power supply position and mounting position of an IC chip 12 are shown in the vicinity of the cut-out portion.

Figure 4:
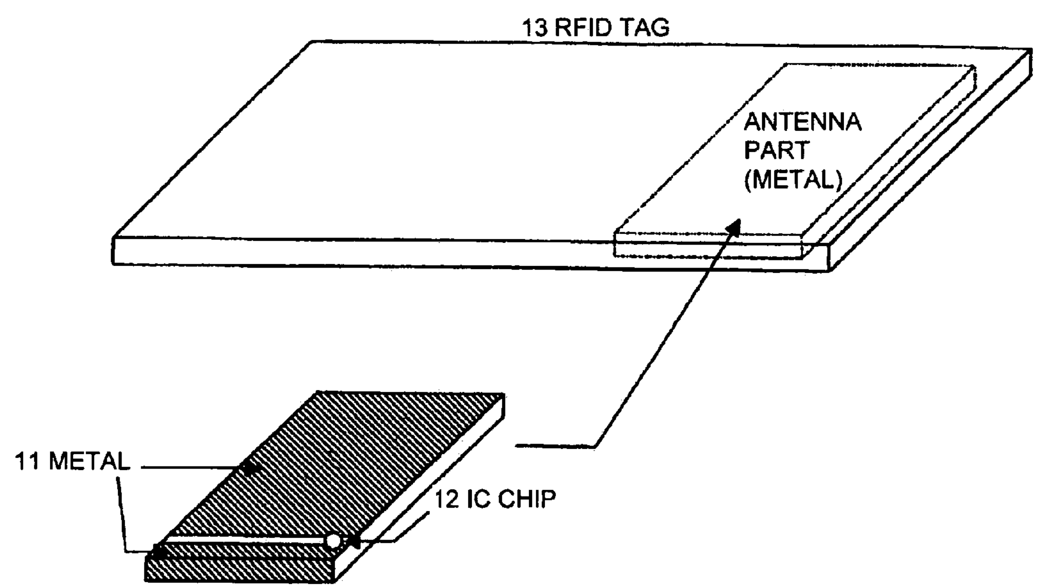
FIG. 4 is a diagram showing an example of the layout of the first plate form loop antenna inside the RFID tag of the present invention.

FIG. 4 shows an example of the layout of a planar loop antenna in an RFID tag of the present invention.

Figure 5:
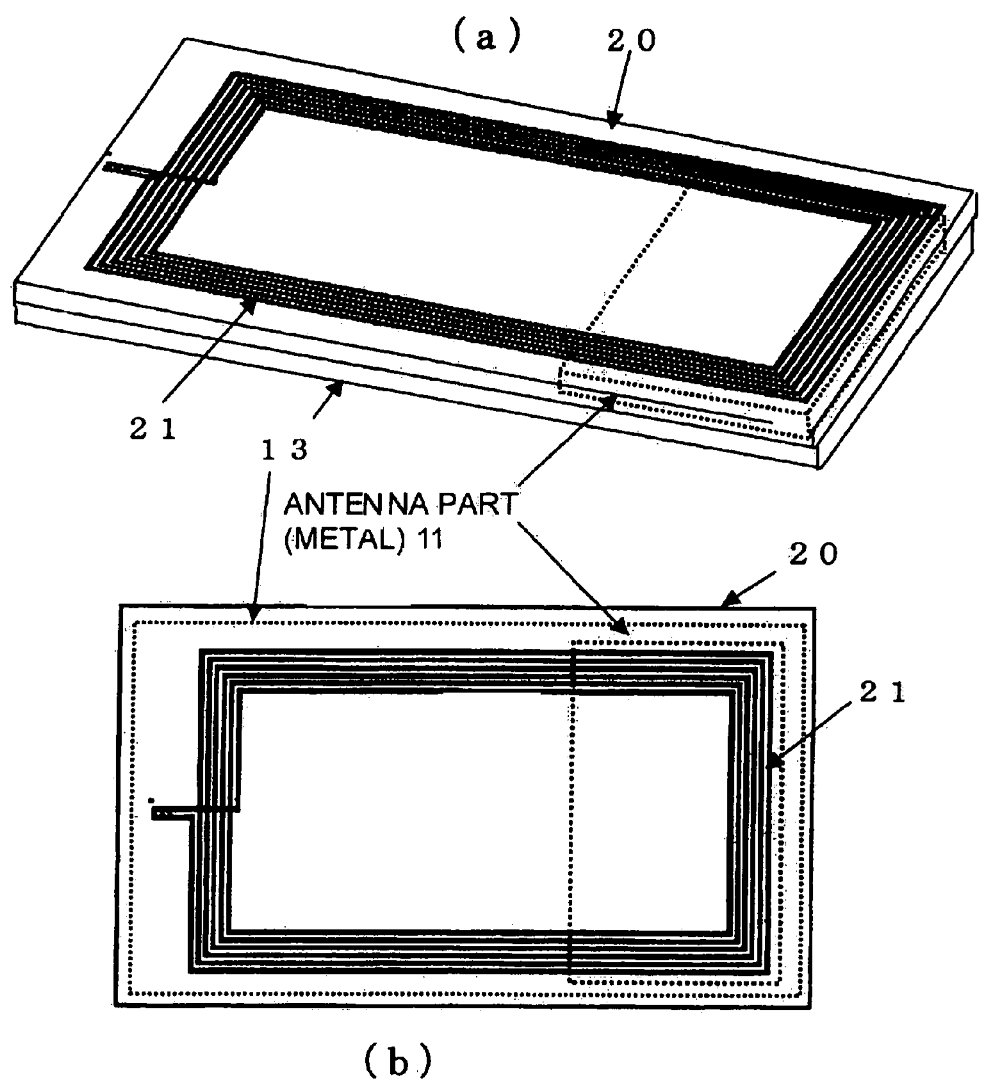
FIG. 5 shows an example of the arrangement where the RFID tag of the present invention and a 13 MHz band RFID tag are stacked.

In FIG. 4, the planar loop antenna of FIG. 3 is placed inside the RFID tag 13 near the end thereof. FIG. 5 shows an example of the arrangement whereby a 13 MHz band RFID tag 20 is superposed on the RFID tag 13 of the present invention, such as UHF or 2.45 GHz tag FIG. 5(*a*) is a block diagram showing a lateral view and FIG. 5(*b*) is a block diagram showing a view from directly above.

FIGS. 5(*a*) and (*b*) assume that a 13 MHz band RFID tag 20 and the RFID tag 13 have been stacked, and the antenna part (metal) held in the RFID tag 13 is arranged at one end thereof. In the 13 MHz band RFID tag 20, as shown in FIGS. 5(*a*) and (*b*), a current is produced in the loop by passing magnetic flux produced by radio waves from the reader-writer inside the coiled loop antenna 21, and communication with the reader-writer is enabled on the basis of this current. The present invention is designed in such a way that, by reducing the antenna part (metal) in size and housing it inside the end part, the inside of this loop antenna 21 is not completely covered by the metal of the antenna, so as to avoid accepting the magnetic flux passing through the interior of the coiled loop antenna 21, as shown in FIGS. 5(*a*) and (*b*). Thus, as can be seen from FIG. 5(*b*), the RFID tag 13 of the present invention is constituted so that a magnetic flux region that is linked to the interior of the coiled loop antenna 21 can be secured, and the problem of failure of operation of the 13 MHz band RFID tag, as has occurred in the past, is solved. As a result, the reader-writer is sufficiently able to read information on the 13 MHz band RFID tag even if a 13 MHz band RFID tag and the RFID tag of the present invention are superposed.

Figure 6:
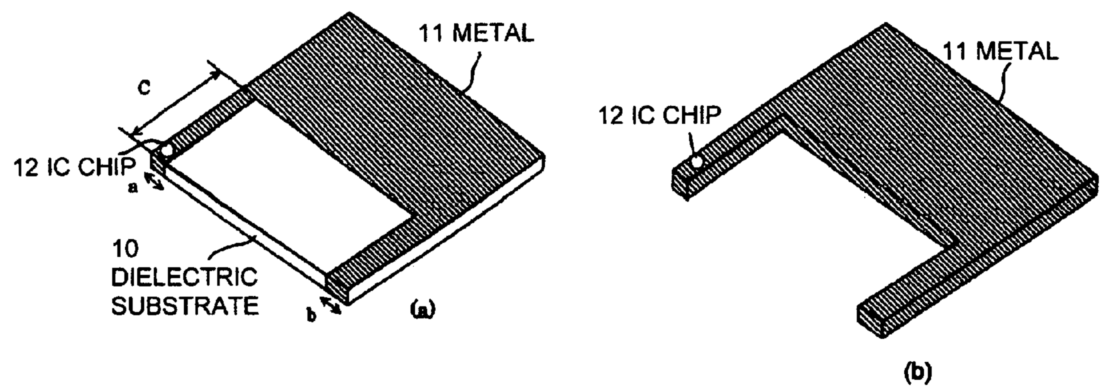
FIG. 6 is a diagram showing the configuration of an exemplary embodiment of an antenna of the present invention in which the length of the loop is increased.

FIG. 6 shows exemplary configurations of an antenna in which the length of the loop in the present invention is increased. In FIG. 6(*a*), a portion of the metal of the planar loop antenna of FIG. 3 is removed, which increases the length of the loop by the distance c, shown in FIG. 6(*a*), and the dielectric substrate exposed, so that the coiled loop antenna of the 13 MHz band RFID tag is not affected even if the RFID tag of FIG. 3 is superposed thereon. FIG. 6(*b*) is a view which shows only the metallic part of the antenna configuration of FIG. 6(*a*). The antenna in FIG. 6 is housed in the end part of the RFID tag in the same way as in FIG. 5.

Figure 7:
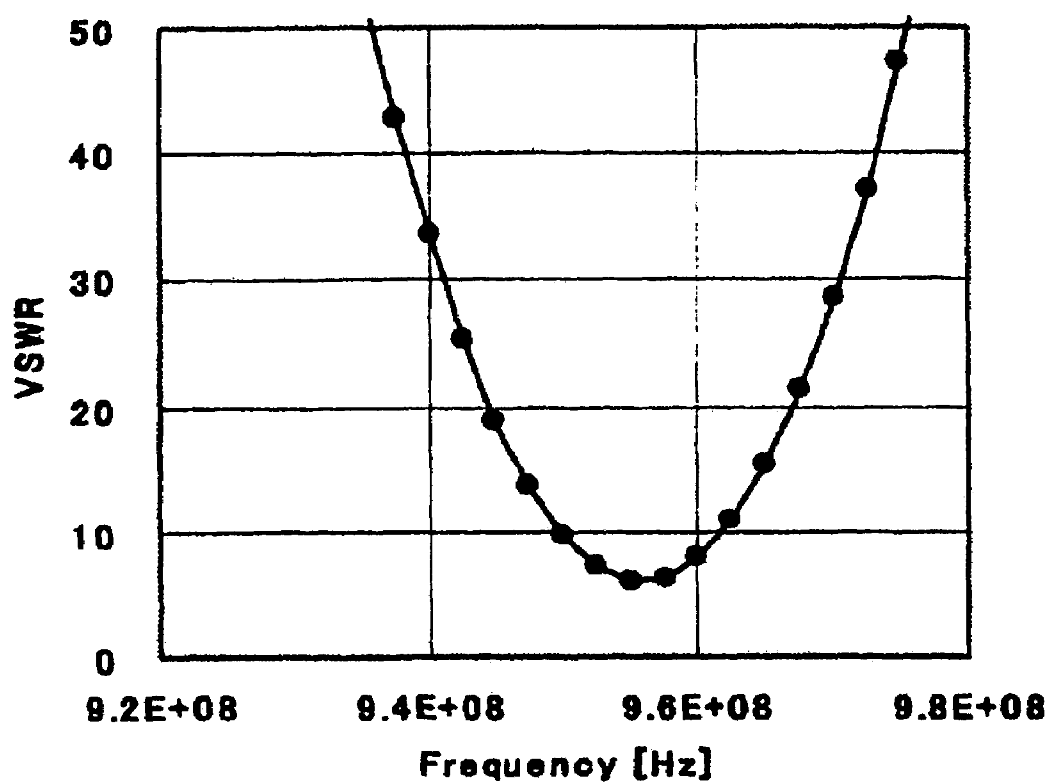
FIG. 7 is a diagram showing an example of the matching characteristics of an antenna and IC chip of the present invention.
Figure 8:
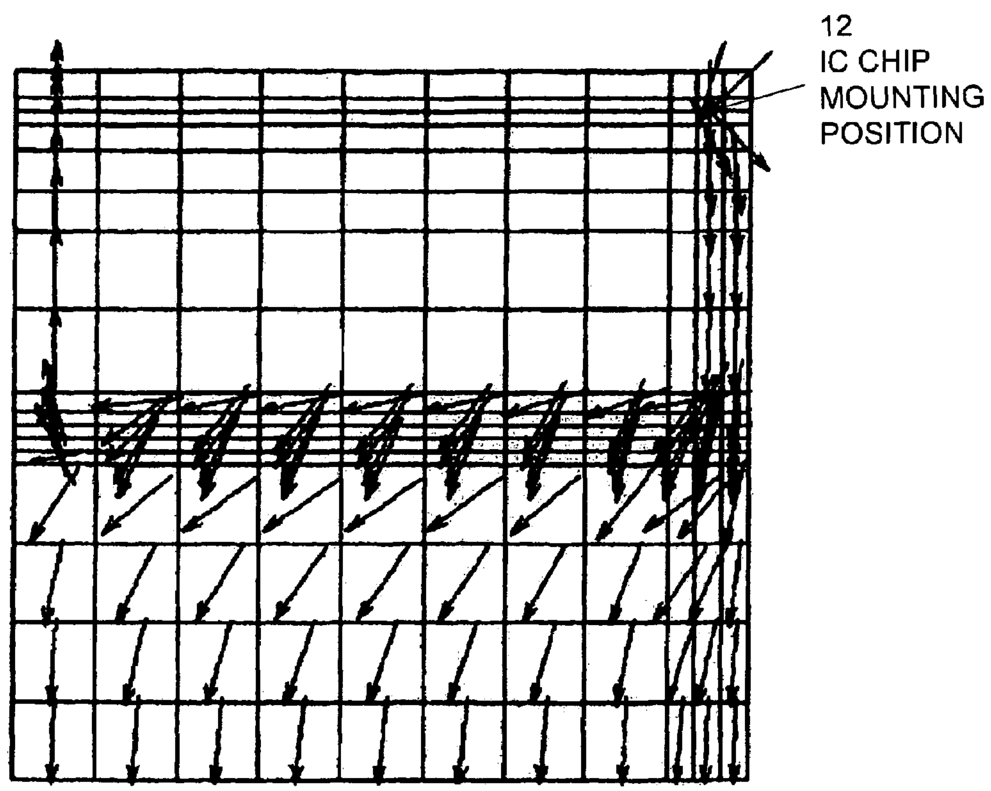
FIG. 8 is a diagram showing an example of the direction of the electrical current flowing on the metal member in FIG. 6(*b*).

The dimensions of the metallic part of the exemplary antenna configuration shown in FIG. 6(*a*) are a=4 mm, b=6 mm, and c=24.5 mm, the dimensions of the dielectric substrate are 54 mm×54 mm×0.4 mm, the substrate relative permittivity is 2.3, the substrate dielectric loss (tanμ) is 0.004, the metallic part conductivity is $3\times10^7$ S/m, and the metal thickness is 9 μm. The chip admittance is about 1 mS in the real part and 10 mS or above in the imaginary part. An antenna configuration and IC chip of this type have characteristics similar to those shown in FIG. 7. The vertical axis for these characteristics shows Voltage Standing Wave Ratio (VSWR), and the horizontal axis shows the frequency. The diagram in FIG. 8 shows the direction of the electrical current passing over the metal is seen from the upper face of FIG. 6(*b*). The starting point from which the current flows is the IC chip mounting position.

Figure 9:
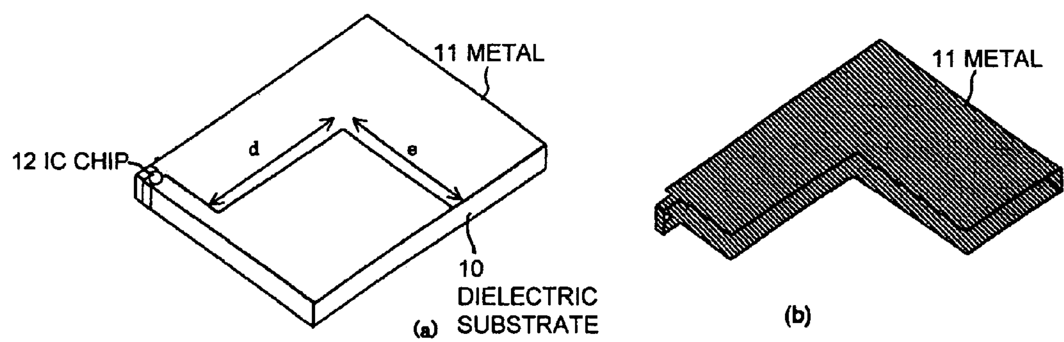
FIG. 9 is a diagram showing an example of the configuration of an embodiment of an antenna which is a variation of the antenna configuration of FIG. 6.

FIG. 9 shows a third antenna configuration which is a variation of the antenna configuration shown in FIG. 6. FIG. 9(*a*) shows the configuration in which the front and back of the dielectric substrate is covered with a cut-out metal part, and the respective metal parts form a loop as metallic wiring. The antenna in FIG. 9 also is housed in the end part of the RFID tag as in FIG. 5.

Figure 10:
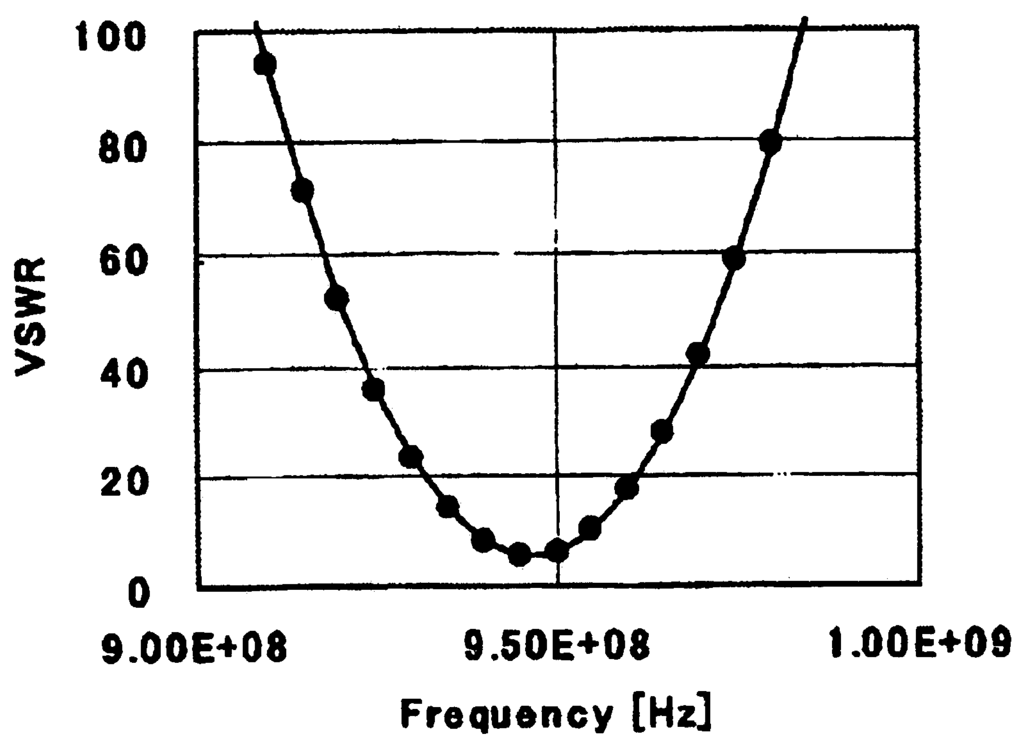
FIG. 10 is a diagram showing an example of the matching characteristics of the third antenna and IC chip of the present invention.

The dimensions of the metallic part of the antenna configuration in FIG. 9(*a*) are d=32 mm and e=29 mm, the dimensions of the dielectric substrate are 60 mm×47 mm×0.6 mm, the relative permittivity of the substrate is 2.3, the substrate dielectric loss (tanδ) is 0.01 or less, the metallic part conductivity is 1×107 S/m, and the metal thickness is 9 μm. The chip admittance is about 1 mS in the real part and 5 mS or above in the imaginary part. An antenna configuration and IC chip of this type have characteristics similar to those shown in FIG. 10.

Figure 11:
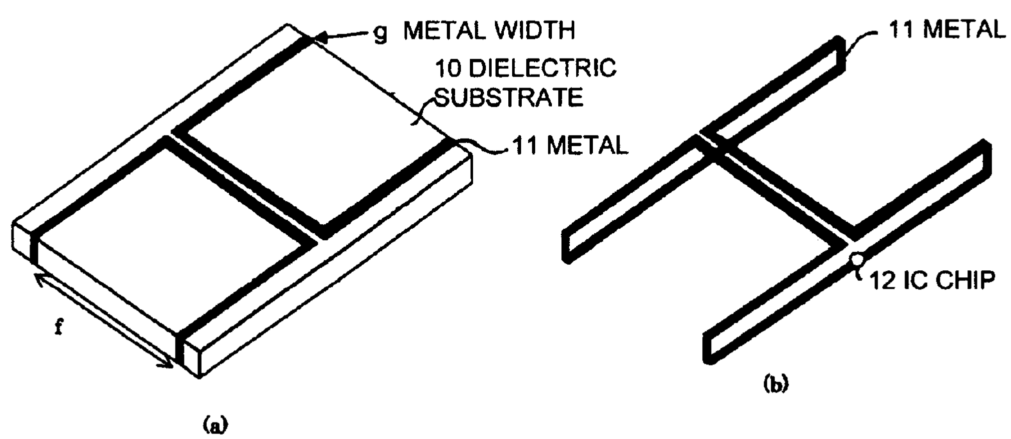
FIG. 11 is a diagram showing an example of the configuration of a folded loop antenna which is a fourth antenna of the present invention.
Figure 12:
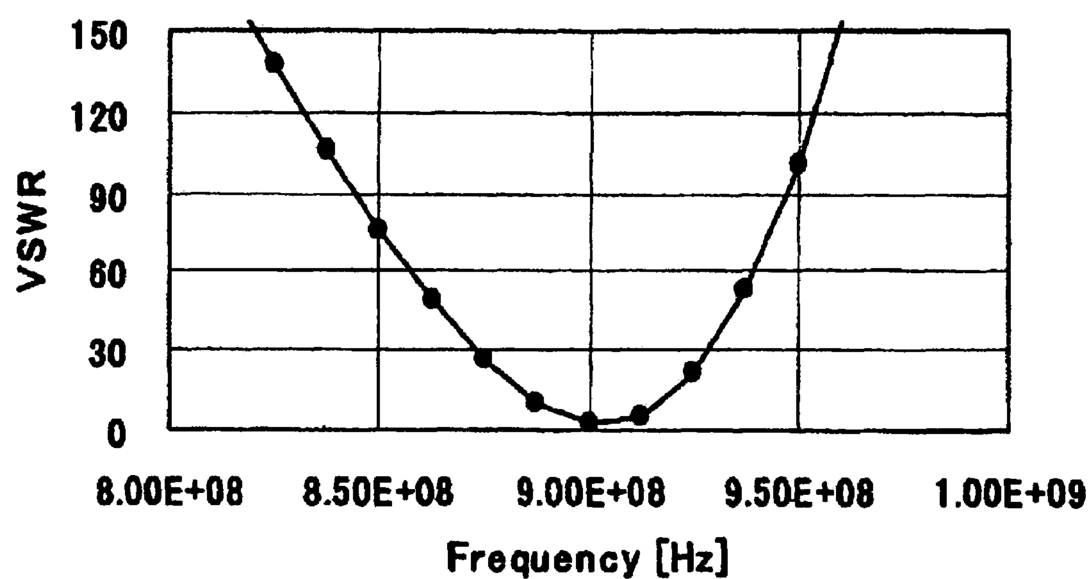
FIG. 12 is a diagram showing an example of the matching characteristics of the fourth antenna and IC chip of the present invention.

FIG. 11 shows the configuration of a folded loop antenna which is the fourth antenna of the present invention. The antenna in FIG. 11 is housed in the end of the RFID tag as in FIG. 5. FIG. 11(*a*) shows the antenna in which both ends of the loop antenna are folded at the center, and the dimensions of the metal forming the antenna are g=2 mm (metal width) and f=41 mm, the dimensions of the dielectric substrate are 82 mm×55 mm×0.8 mm, the relative permittivity of the substrate is 3.5, the substrate dielectric loss (tanδ) is 0.01 or less, the metallic part conductivity is 1×107 S/m, and the metal thickness 35 μm. The chip admittance is about 1 mS in the real part and 5 mS or above in the imaginary part. An antenna configuration and IC chip of this type have characteristics similar to those shown in FIG. 12.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An RFID tag assembly comprising:

a first RFID tag having a coiled loop antenna; and a second RFID tag superposed on the first RFID tag, the second RFID tag comprising:

an antenna formed by a metal member which covers at least a portion of a surface of a dielectric substrate, and an electronic part mounted on the metal member;

wherein a portion of the coiled loop antenna overlaps a portion of the antenna formed by the metal member.

2. The RFID tag assembly of claim 1, wherein the metal member is planar.

3. The RFID tag assembly of claim 2, wherein:

the first RFID tag operates at a 13 MHz band of frequencies.

4. The RFID tag assembly of claim 2, wherein:

the second RFID tag operates at a UHF band of frequencies.

5. The RFID tag assembly of claim 4, wherein:

the first RFID tag operates at a 13 MHz band of frequencies.

6. An RFID tag assembly comprising:

a first RFID tag having a coiled loop antenna; and a second RFID tag superposed on the first RFID tag, the second RFID tag comprising:

an antenna formed by a partially cut-out metal member which covers at least a portion of a surface of a dielectric substrate, and an electronic part mounted on the metal member;

wherein a portion of the coiled loop antenna overlaps a portion of the antenna formed by the metal member.

7. The RFID tag assembly of claim 6, wherein the metal member is planar.

8. The RFID tag assembly of claim 7, wherein:

the first RFID tag operates at a 13 MHz band of frequencies.

9. The RFID tag assembly of claim 7, wherein:

the second RFID tag operates at a UHF band of frequencies.

10. The RFID tag assembly of claim 9, wherein:

the first RFID tag operates at a 13 MHz band of frequencies.

11. The RFID tag assembly of claim 7, wherein:

the partial cut-out has a depth of approximately 24.5 mm and is arranged so that one side of the partial cut-out is 4 mm from one edge of the dielectric substrate and another side of the partial cut-out is 6 mm from another edge of the dielectric substrate.

12. The RFID tag assembly of claim 11, wherein:

dimensions of the dielectric substrate are approximately 54 mm×54 mm×0.4 mm.

13. The RFID tag assembly of claim 12, wherein:

a relative permittivity of the dielectric substrate is approximately 2.3.

14. The RFID tag assembly of claim 13, wherein:

a dielectric loss (tanδ) of the dielectric substrate is approximately 0.004.

15. The RFID tag assembly of claim 14, wherein:

a conductivity of the metal member is approximately $3\times10^7$ S/m.

16. The RFID tag assembly of claim 15, wherein:

a thickness of the metal member is approximately 9 μm.

17. The RFID tag assembly of claim 16, wherein:

admittance of the electronic part is approximately 1 mS in a real part and 10 mS or greater in an imaginary part.

18. An RFID tag comprising:

an antenna formed by a metal member forming a folded loop which covers at least a portion of a surface of a dielectric substrate;

an electronic part mounted on the metal member; and a member which houses the antenna in its end.

19. The RFID tag of claim 18, wherein:

the folded loop has sides having of approximately 32 mm and 29 mm.

20. The RFID tag of claim 19, wherein:

dimensions of the dielectric substrate are approximately 60 mm×47 mm×0.6 mm.

21. The RFID tag of claim 20, wherein:

a relative permittivity of the dielectric substrate is approximately 2.3.

22. The RFID tag of claim 21, wherein:

a dielectric loss (tanδ) of the dielectric substrate is approximately 0.01 or less.

23. The RFID tag of claim 22, wherein:

a conductivity of the metal member is approximately $1\times10^7$ S/m.

24. The RFID tag of claim 23, wherein:

a thickness of the metal member is approximately 9 μm.

25. The RFID tag of claim 24, wherein:

admittance of the electronic part is approximately 1 mS in a real part and 5 mS or greater in an imaginary part.

26. An RFID tag comprising:

an antenna formed by a metal member which covers at least a portion of a surface of a dielectric substrate, and which forms a loop near a center portion of the dielectric substrate, and in which both ends of the loop are folded;

an electronic part mounted on the metal member, and a member which houses the antenna in its end.

27. The RFID tag of claim 26, wherein:

the folded loop has a width of the metal member approximately 2 mm and the ends of the folded loop are approximately 41 mm apart.

28. The RFID tag of claim 27, wherein:

dimensions of the dielectric substrate are approximately 82 mm×55 mm×0.8 mm.

29. The RFID tag of claim 28, wherein:

a relative permittivity of the dielectric substrate is approximately 3.5.

30. The REID tag of claim 29, wherein:

a dielectric loss (tanδ) of the dielectric substrate is approximately 0.01 or less.

31. The RFID tag of claim 30, wherein:

a conductivity of the metal member is approximately $1\times10^7$ S/m.

32. The REID tag of claim 31, wherein:

a thickness of the metal member is approximately 35 μm.

33. The RFID tag of claim 32, wherein:

admittance of the electronic part is approximately 1 mS in a real part and 5 mS or greater in an imaginary part.

* * * * *